United States Patent
Dalquist

(10) Patent No.: US 9,677,867 B2
(45) Date of Patent: Jun. 13, 2017

(54) SQUARING TAPE APPARATUS AND KITS

(71) Applicant: Andersen Corporation, Bayport, MN (US)

(72) Inventor: Kurt Dalquist, Lindstrom, MN (US)

(73) Assignee: ANDERSEN CORPORATION, Bayport, MN (US)

( * ) Notice: Subject to any disclaimer, the term of this patent is extended or adjusted under 35 U.S.C. 154(b) by 83 days.

(21) Appl. No.: 14/603,568

(22) Filed: Jan. 23, 2015

(65) Prior Publication Data

US 2015/0211834 A1    Jul. 30, 2015

Related U.S. Application Data

(60) Provisional application No. 61/931,215, filed on Jan. 24, 2014, provisional application No. 61/971,034, filed on Mar. 27, 2014.

(51) Int. Cl.
*G01B 3/10* (2006.01)

(52) U.S. Cl.
CPC .................. *G01B 3/1084* (2013.01)

(58) Field of Classification Search
CPC .................................................. G01B 3/1084
USPC .................. 33/759, 760, 761, 766, 768, 770
See application file for complete search history.

(56) References Cited

U.S. PATENT DOCUMENTS

| | | |
|---|---|---|
| 160,471 A | 3/1875 | Robinson |
| 224,401 A | 2/1880 | Derickson |
| 401,292 A | 4/1889 | Mumford |
| 563,277 A | 7/1896 | Jewell et al. |
| 978,446 A | 12/1910 | Gasstrom |
| 2,240,753 A | 5/1941 | Bouchard et al. |
| 2,518,128 A | 8/1950 | Dufilho |
| 2,664,633 A * | 1/1954 | Reich ........................ A41H 9/02 101/20 |
| 2,684,534 A | 7/1954 | Ljungberg |
| 3,220,112 A | 11/1965 | Quenot |
| 3,376,648 A | 4/1968 | Ljungberg |
| 3,889,897 A | 6/1975 | Van Zelderen |
| 4,131,244 A | 12/1978 | Quenot |
| 4,202,108 A | 5/1980 | Adams, Jr. et al. |
| 4,399,616 A | 8/1983 | Jansson |
| 4,466,194 A * | 8/1984 | Rutty ........................ G01B 3/02 33/770 |
| 4,977,684 A | 12/1990 | Mosman |
| 5,038,493 A | 8/1991 | Stabs |
| 5,060,394 A | 10/1991 | Lincoln et al. |

(Continued)

OTHER PUBLICATIONS

BCW Industries, *Squaring Poles Brochure* (2 printed pages), published Jun. 15, 2011, Wausau, WI, USA, retrieved from http://www.squaringpoles.com/images/SQUARING_POLES_BROCHURE_and_ORDER_FORM_07-2014.pdf on Jun. 16, 2015.

(Continued)

*Primary Examiner* — G. Bradley Bennett
(74) *Attorney, Agent, or Firm* — Mueting, Raasch & Gebhardt, P.A.

(57) ABSTRACT

Squaring tape apparatus and kits for converting a conventional measuring tape into a squaring tape apparatus are described herein. The squaring tape apparatus and kits described herein provide a measuring tape that is capable of accurately measuring diagonal distances across a window or door frame from inside corner to inside corner.

28 Claims, 8 Drawing Sheets

(56) References Cited

U.S. PATENT DOCUMENTS

| | | | |
|---|---|---|---|
| 5,291,664 A * | 3/1994 | Pinney, Jr. | G01B 3/1061 33/485 |
| 5,832,622 A | 11/1998 | Mann | |
| 5,873,175 A | 2/1999 | Johnston | |
| 6,796,052 B1 * | 9/2004 | Lin | G01B 3/1056 33/758 |
| 6,918,191 B2 | 7/2005 | Stauffer et al. | |
| 7,159,332 B2 | 1/2007 | Sullivan | |
| 7,168,182 B2 * | 1/2007 | Kilpatrick | G01B 3/1056 33/760 |
| 7,281,340 B2 * | 10/2007 | Greally | G01B 3/1056 33/758 |
| 7,484,313 B1 * | 2/2009 | Ogilvie | B25H 7/00 33/760 |
| 7,584,548 B2 | 9/2009 | Nielson | |
| 7,716,848 B1 * | 5/2010 | Calvey | G01B 3/1056 33/758 |
| 7,900,370 B1 | 3/2011 | Treige | |
| 8,601,709 B2 * | 12/2013 | Sun | G01B 7/02 33/755 |
| 8,898,921 B1 | 12/2014 | Adorno | |
| 2002/0011008 A1 * | 1/2002 | Nelson | G01B 3/1056 33/770 |
| 2014/0196302 A1 * | 7/2014 | Ricalde | G01B 3/1041 33/770 |
| 2016/0069657 A1 * | 3/2016 | Kuo | G01B 3/1041 33/768 |

OTHER PUBLICATIONS

SQUARESTIX, Website (6 printed pages) retrieved from www.squarestix.com on Jun. 16, 2015—Applicant became aware of this information on or about Dec. 29, 2014.

SQUARESTIX, Product Information, (2 printed pages), retrieved from http://www.squarestix.com/ourstix.html on Jun. 16, 2015—Applicant became aware of this information on or about Dec. 29, 2014.

* cited by examiner

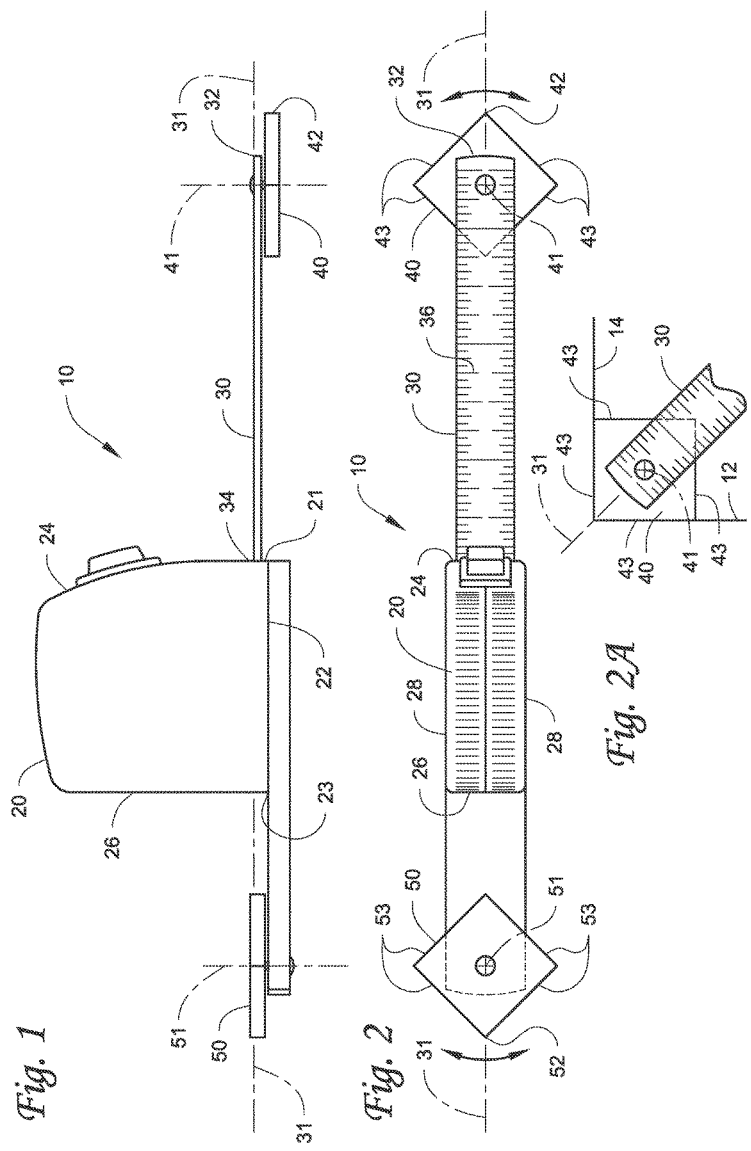

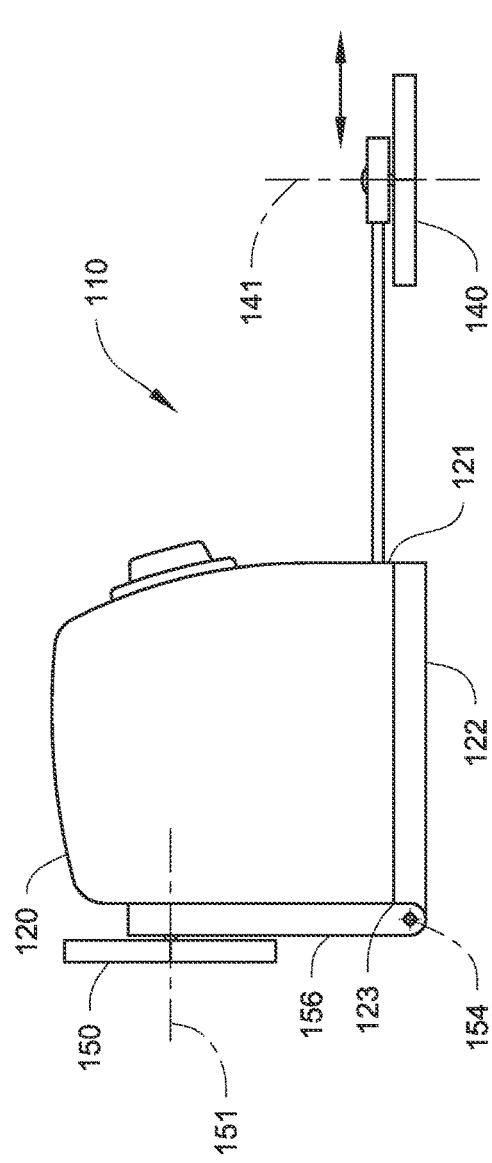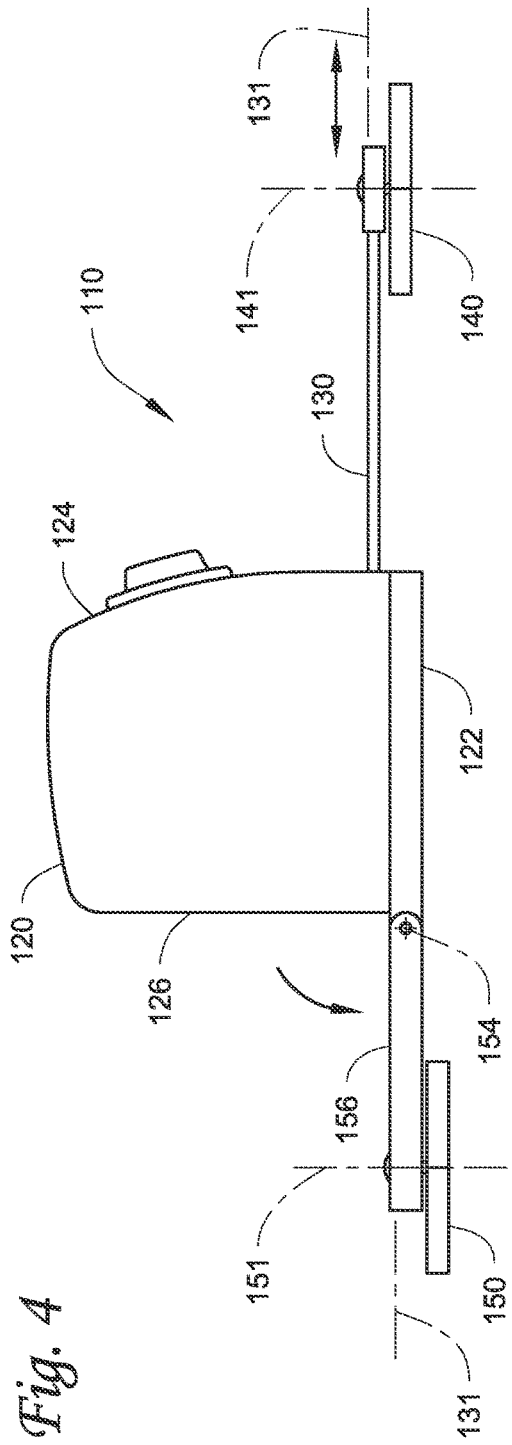

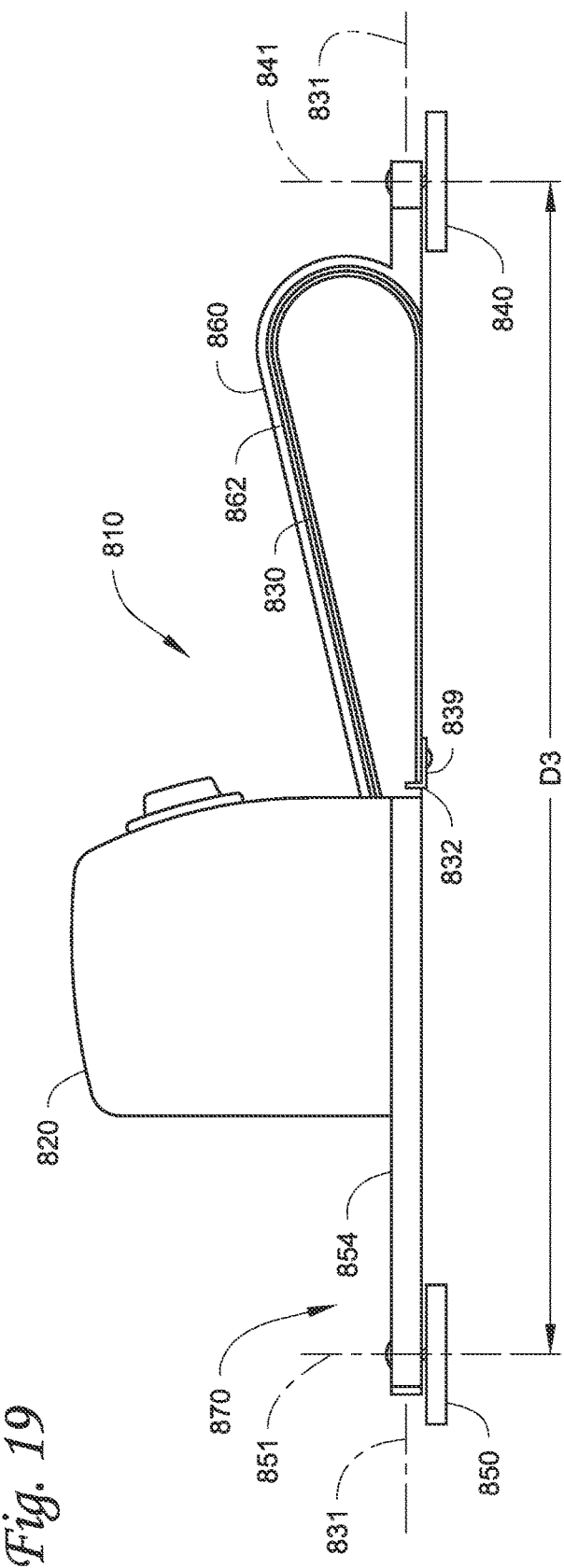

SQUARING TAPE APPARATUS AND KITS

The present application claims the benefit, under 35 U.S.C. §119, of U.S. Provisional Application Ser. No. 61/931,215 titled SQUARING TAPE APPARATUS AND KITS filed on Jan. 24, 2014 and U.S. Provisional Application Ser. No. 61/971,034 titled SQUARING TAPE APPARATUS AND KITS filed on Mar. 27, 2014, both of which are incorporated herein by reference in their entirety.

Squaring tape apparatus and kits for converting a conventional measuring tape into a squaring tape apparatus are described herein.

Squaring a window or door in a frame opening using conventional measuring tapes is difficult due to the shape and nature of how a conventional tape measure works. The squaring process typically involves taking two diagonal measurements and comparing those measurements which, when equal, indicate that the frame is square. These measurements are typically taken from inside corner to inside corner, diagonally across the frame opening. The construction of conventional tape measures is not, however, conducive to measuring that dimension because the distal end of the tape measure typically includes a hook designed to perform outside measurements and the tape is usually curled back on itself to obtain a measurement near the housing of the tape measure. Examples of some conventional measuring tapes are described in, e.g., U.S. Pat. Nos. 3,220,112; 3,889,897; 4,131,244; etc.

SUMMARY

Squaring tape apparatus and kits for converting a conventional measuring tape into a squaring tape apparatus are described herein.

In one or more embodiments, the squaring tape apparatus and kits described herein provide a device that is capable of accurately measuring diagonal distances across a window or door frame opening from inside corner to inside corner.

In one or more embodiments, the squaring tape apparatus described herein may be dedicated specifically for use in squaring window or door frames by measuring diagonal distances between inside corners of the frame openings. In one or more embodiments, the kits described herein may be used to convert a conventional tape measure into a squaring tape apparatus as described herein for use in squaring window or door frames.

In a first aspect, one or more embodiments of a squaring tape apparatus as described herein may include: a housing comprising a base that comprises a first end and a second end, a front wall extending upward from the first end of the base, a rear wall extending upward from the second end of the base, and two sidewalls extending between the front wall and the rear wall, the two sidewalls extending upward from the base; a tape coiled within the housing, the tape comprising a distal end that exits the housing through a tape opening located at a junction between the front wall and the base, wherein the tape is configured to be pulled out of the housing through the tape opening, and wherein the tape is configured to retract back into the housing in the absence of forces acting to pull the tape out of the housing, and wherein the tape defines a measuring axis extending through the distal end and along a length of the tape when the tape is extended outward from the tape opening, and further wherein the tape comprises opposing edges extending along the measuring axis, the opposing edges defining a width measured transverse to the measuring axis; a first corner positioning fixture at the distal end of the tape, wherein the first corner positioning fixture is configured to rotate about a first axis relative to the tape, wherein the first axis is transverse to the measuring axis and transverse to the width of the tape, and wherein the first corner positioning fixture comprises a left contact surface located on a left side of the measuring axis and a right contact surface located on a right side of the measuring axis, wherein the left and right contact surfaces are defined by a first angle that is bisected by the measuring axis when the vertex of the first angle is located on the measuring axis, and wherein the left contact surface contacts a first framing member and the right contact surface contacts a second framing member when the tape is extended from the housing such that the first corner positioning fixture is inserted into a first framing corner defined by the first and second framing members.

In one or more embodiments of the first aspect of the squaring tape apparatus described herein, the first angle is within a range of 80 to 100 degrees.

In one or more embodiments of the first aspect of the squaring tape apparatus described herein, the first angle is a right angle.

In one or more embodiments of the first aspect of the squaring tape apparatus described herein, the first corner positioning fixture is configured to rotate 360 degrees about the first axis.

In one or more embodiments of the first aspect of the squaring tape apparatus described herein, the first corner positioning fixture is configured to rotate less than 360 degrees about the first axis.

In one or more embodiments of the first aspect of the squaring tape apparatus described herein, the apparatus comprises a second corner positioning fixture attached to the second end of the base, wherein the second corner positioning fixture is configured to rotate about a second axis, wherein the second axis is transverse to the measuring axis and aligned with the first axis, and wherein the second corner positioning fixture comprises a left contact surface located on a left side of the measuring axis and a right contact surface located on a right side of the measuring axis, wherein the left and right contact surfaces are defined by a second angle that is bisected by the measuring axis when the vertex of the second angle is located on the measuring axis, and wherein the left contact surface contacts a third framing member and the right contact surface contacts a fourth framing member when the second corner positioning fixture is inserted into a second framing corner defined by the third and fourth framing members, wherein the second framing corner is located diagonally opposite from the first framing corner; wherein the squaring tape apparatus is configured to measure a distance between the first and second framing corners.

In one or more embodiments of the first aspect of the squaring tape apparatus described herein that include a second corner positioning fixture, the second angle is within a range of 80 to 100 degrees.

In one or more embodiments of the first aspect of the squaring tape apparatus described herein that include a second corner positioning fixture, the second angle is a right angle.

In one or more embodiments of the first aspect of the squaring tape apparatus described herein that include a second corner positioning fixture, the second corner positioning fixture is configured to rotate 360 degrees about the second axis.

In one or more embodiments of the first aspect of the squaring tape apparatus described herein that include a second corner positioning fixture, the second corner positioning fixture is configured to rotate less than 360 degrees about the second axis.

In one or more embodiments of the first aspect of the squaring tape apparatus described herein, a projection of the first corner positioning fixture onto a plane parallel with the width of the tape is in the form of a square with chamfered corners, wherein the left and right contact surfaces of the first corner positioning fixture form adjacent sides of the square.

In one or more embodiments of the first aspect of the squaring tape apparatus described herein that include a second corner positioning fixture, a projection of the second corner positioning fixture onto a plane parallel with the width of the tape is in the form of a second square with chamfered corners, wherein the left and right contact surfaces of the second corner positioning fixture form adjacent sides of the second square.

In one or more embodiments of the first aspect of the squaring tape apparatus described herein, the first corner positioning fixture is configured to rotate 100 degrees or less about the first axis, and wherein a projection of the first corner positioning fixture onto a plane parallel with the width of the tape is in the form of a triangle with a chamfered corner distal from the housing, and further wherein the chamfered corner moves between right and left sides of the measuring axis as the first corner positioning block rotates about the first axis.

In one or more embodiments of the first aspect of the squaring tape apparatus described herein that include a second corner positioning fixture, the second corner positioning fixture is configured to rotate less than 360 degrees about the second axis, and wherein a projection of the second corner positioning fixture onto a plane parallel with the width of the tape is in the form of a triangle with a chamfered corner distal from the housing, and further wherein the chamfered corner moves between right and left sides of the measuring axis as the second corner positioning block rotates about the second axis.

In one or more embodiments of the first aspect of the squaring tape apparatus described herein that include a second corner positioning fixture, a distance between the first end of the base and the second axis is greater than a distance between the first end and the second end of the base.

In one or more embodiments of the first aspect of the squaring tape apparatus described herein that include a second corner positioning fixture, the apparatus comprises a third corner positioning fixture attached to the housing such that the second corner positioning fixture is located between the third corner positioning fixture and the housing along the measuring axis, wherein the third corner positioning fixture comprises a left contact surface located on a left side of the measuring axis and a right contact surface located on a right side of the measuring axis, wherein the left and right contact surfaces are defined by an angle that is bisected by the measuring axis when the vertex of the angle is located on the measuring axis, and wherein the left contact surface contacts the third framing member and the right contact surface contacts the fourth framing member when the third corner positioning fixture is inserted into the second framing corner.

In one or more embodiments of the first aspect of the squaring tape apparatus described herein, the tape comprises visible measurement indicia on a surface thereof that is configured to indicate a distance between the first axis and the second axis along the measuring axis.

In a second aspect, one or more embodiments of a squaring tape apparatus as described herein may include: a housing comprising a base that comprises a first end and a second end, a front wall extending upward from the first end of the base, a rear wall extending upward from the second end of the base, and two sidewalls extending between the front wall and the rear wall, the two sidewalls extending upward from the base; a tape coiled within the housing, the tape comprising a distal end that exits the housing through a tape opening located at a junction between the front wall and the base, wherein the tape is configured to be pulled out of the housing through the tape opening, and wherein the tape is configured to retract back into the housing in the absence of forces acting to pull the tape out of the housing, and wherein the tape defines a measuring axis extending through the distal end and along a length of the tape when the tape is extended outward from the tape opening, and further wherein the tape comprises opposing edges extending along the measuring axis, the opposing edges defining a width measured transverse to the measuring axis; and a first corner positioning fixture at the distal end of the tape, wherein the first corner positioning fixture comprises a left circular arcuate surface located on a left side of the measuring axis and a right circular arcuate surface located on a right side of the measuring axis, wherein the left and right circular arcuate surfaces are defined by a first circle having a first center on the measuring axis proximal from the distal end of the tape, wherein the left circular arcuate surface contacts a first framing member and the right circular arcuate surface contacts a second framing member when the tape is extended from the housing such that the first corner positioning fixture is inserted into a first framing corner defined by the first and second framing members, wherein the circle is located in a plane defined by the measuring axis and the opposing edges of the tape when extended out of the housing.

In one or more embodiments of the second aspect of the squaring tape apparatus described herein, the left circular arcuate surface comprises a first endpoint defined by a first angle bisected by the measuring axis and having a first vertex on the measuring axis, wherein the first angle is 60° or more.

In one or more embodiments of the second aspect of the squaring tape apparatus described herein, the right circular arcuate surface comprises a first endpoint defined by the first angle.

In one or more embodiments of the second aspect of the squaring tape apparatus described herein, the left circular arcuate surface comprises a second endpoint defined by a second angle bisected by the measuring axis and having a second vertex on the measuring axis, wherein the second angle is less than 180°. In one or more embodiments, the right circular arcuate surface comprises a second endpoint defined by the second angle.

In one or more embodiments of the second aspect of the squaring tape apparatus described herein, the apparatus comprises a second corner positioning fixture attached to the second end of the base of the housing, wherein the second corner positioning fixture comprises a left circular arcuate surface located on a left side of the measuring axis and a right circular arcuate surface located on a right side of the measuring axis, wherein the left and right circular arcuate surfaces are defined by a second circle having a second center on the measuring axis proximal from the distal end of the tape, wherein the left circular arcuate surface contacts a third framing member and the right circular arcuate surface contacts a fourth framing member when the second corner positioning fixture is inserted into a second framing corner defined by the third and fourth framing members, wherein the second framing corner is located diagonally opposite from the first framing corner, and wherein the circle is located in a plane defined by the measuring axis and the opposing edges of the tape when the tape is extended out of the housing; and wherein the squaring tape apparatus is configured to measure a distance between the first and second framing corners.

In one or more embodiments of the second aspect of the squaring tape apparatus described herein, the first corner positioning fixture is in the form of a generally circular disc.

In one or more embodiments of the second aspect of the squaring tape apparatus described herein, the apparatus comprises a second corner positioning fixture attached to the second end of the base of the housing, wherein the second corner positioning fixture comprises a left circular arcuate surface located on a left side of the measuring axis and a right circular arcuate surface located on a right side of the measuring axis, wherein the left and right circular arcuate surfaces are defined by a second circle having a second center on the measuring axis proximal from the distal end of the tape, wherein the left circular arcuate surface contacts a third framing member and the right circular arcuate surface contacts a fourth framing member when the second corner positioning fixture is inserted into a second framing corner defined by the third and fourth framing members, wherein the second framing corner is located diagonally opposite from the first framing corner, and wherein the circle is located in a plane defined by the measuring axis and the opposing edges of the tape when the tape is extended out of the housing; and wherein the squaring tape apparatus is configured to measure a distance between the first and second framing corners.

In one or more embodiments of the second aspect of the squaring tape apparatus including a second corner positioning fixture as described herein, a distance between the first end of the base and the second center of the second corner positioning fixture is greater than a distance between the first end and the second end of the base.

In one or more embodiments of the second aspect of the squaring tape apparatus including a second corner positioning fixture as described herein, the second corner positioning fixture is in the form of a generally circular disc.

In one or more embodiments of the second aspect of the squaring tape apparatus including a second corner positioning fixture as described herein, the apparatus comprises a third corner positioning fixture attached to the housing such that the second corner positioning fixture is located between the third corner positioning fixture and the housing along the measuring axis, wherein the third corner positioning fixture comprises a left circular arcuate surface located on a left side of the measuring axis and a right circular arcuate surface located on a right side of the measuring axis, wherein the left and right circular arcuate surfaces are defined by a third circle having a third center on the measuring axis, wherein the left circular arcuate surface contacts the third framing member and the right circular arcuate surface contacts the fourth framing member when the third corner positioning fixture is inserted into the second framing corner.

In one or more embodiments of the second aspect of the squaring tape apparatus including a second corner positioning fixture as described herein, the tape comprises visible indicia configured to indicate a distance between the first axis and the second axis along the measuring axis.

In a third aspect, one or more embodiments of a kit configured to convert a measuring tape to a squaring tape apparatus as described herein may include: a first corner positioning fixture apparatus configured to attach to a distal end of measuring tape contained within a housing, wherein first corner positioning fixture apparatus comprises a first corner positioning fixture as described herein; and a second corner positioning fixture apparatus configured to attach to the housing containing the measuring tape, wherein the second corner positioning fixture apparatus positions a second corner positioning fixture as described herein; wherein the measuring tape, first corner positioning fixture apparatus attached to the measuring tape and second corner positioning fixture apparatus attached to the housing are configured to measure a distance between the first and second framing corners.

In one or more embodiments of the kits described herein, the second corner positioning fixture apparatus is adhesively attached to the housing.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the squaring tape apparatus and kits described herein. Rather, a more complete understanding of the invention will become apparent and appreciated by reference to the following Description of Illustrative Embodiments and claims in view of the accompanying figures of the drawing.

BRIEF DESCRIPTION OF THE VIEWS OF THE DRAWING

FIG. 1 is a side view of one illustrative embodiment of a squaring tape apparatus as described herein.

FIG. 2 is a top view of the squaring tape apparatus depicted in FIG. 1.

FIG. 2A depicts the corner positioning fixture of the squaring tape apparatus of FIGS. 1 and 2 inserted into a framing corner.

FIGS. 3 and 4 are side views of another illustrative embodiment of a squaring tape apparatus as described herein.

FIG. 19 is a side view of another illustrative embodiment of a first corner positioning fixture apparatus that may be used in a kit to convert a conventional tape measure into a squaring tape apparatus as described herein.

FIG. 20 is a top view of the squaring tape apparatus depicted in FIG. 19.

DESCRIPTION OF ILLUSTRATIVE EMBODIMENTS

Figure 5:
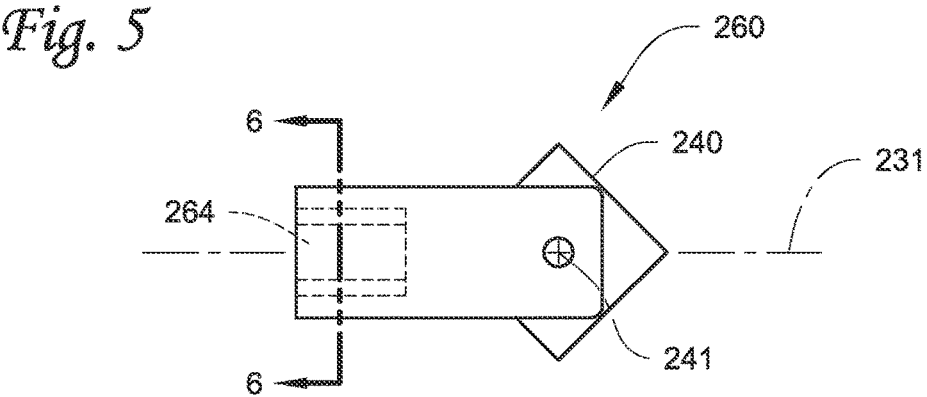
FIG. 5 is a top view of one illustrative embodiment of a first corner positioning fixture apparatus that may be used in a kit to convert a conventional tape measure into a squaring tape apparatus as described herein.
Figure 6:
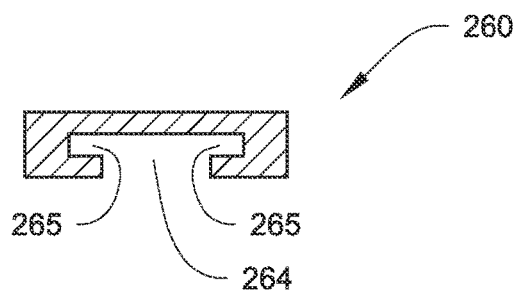
FIG. 6 is a cross-sectional view of the first corner positioning fixture apparatus depicted in FIG. 5 taken along line 6-6 in FIG. 5.
Figure 7:
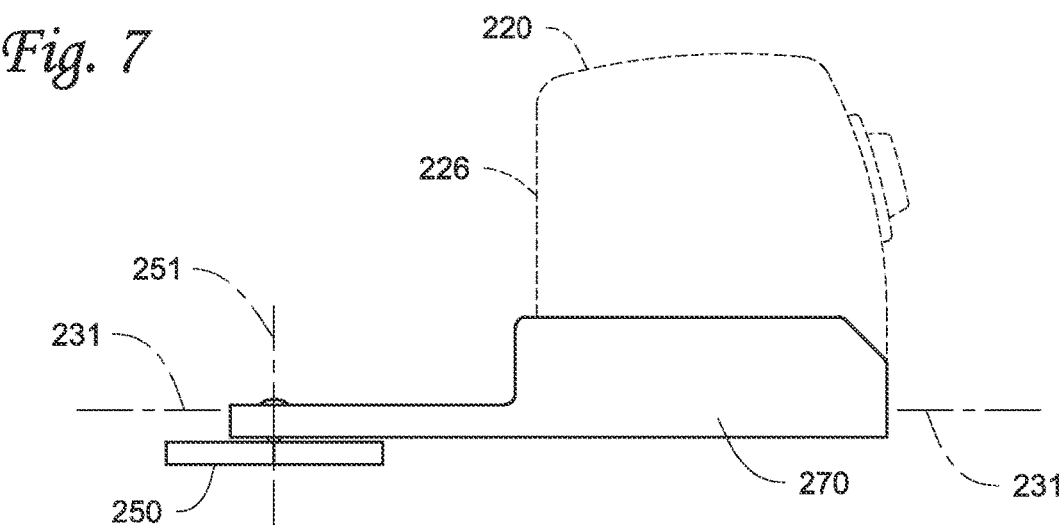
FIG. 7 is a side view of one illustrative embodiment of a second corner positioning fixture apparatus that may be used in a kit to convert a conventional tape measure into a squaring tape apparatus as described herein.
Figure 8:
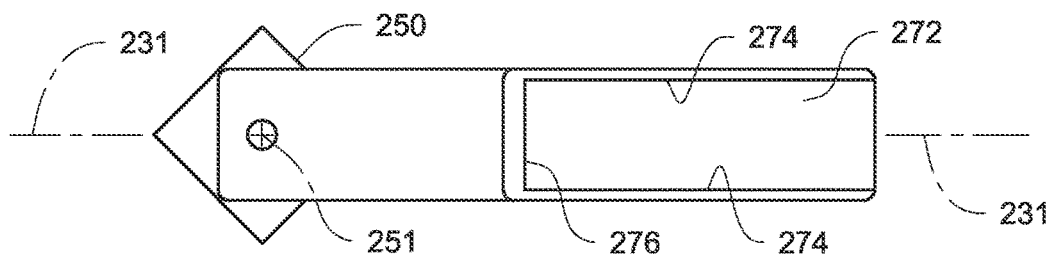
FIG. 8 is a top view of the second corner positioning fixture apparatus depicted in FIG. 7.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

One illustrative embodiment of a squaring tape apparatus 10 as described herein is depicted in FIGS. 1 and 2. The apparatus 10 includes a housing 20 having a base 22 that extends from a first end 21 to a second end 23. The housing 20 further includes a front wall 24 extending upward from the first end 21 of the base 22. A rear wall 26 extends upward from the second end 23 of the base 22. Two sidewalls 28 extend between the front wall 24 to the rear wall 26 of the housing 20, with the two sidewalls 28 extending upward from the base 22 of the housing 20.

A tape 30 is coiled within the housing 20 as in conventional tape measures. In particular, the tape 30 is typically wound on a reel that is rotatably supported in the housing 20. The tape 30 may be constructed of steel, plastic, fiberglass or another relatively flexible material that can be wound on the reel. The tape 30 may, in one or more embodiments, include measurement indicia 36 thereon such that, when unwound and extended from the housing 20, the tape 30 can be used to measure linear distances. The tape 30 may be rewound into the housing manually using a crank or automatically using, e.g., a spring.

The tape 30 has a distal end 32 that extends away from the housing 20 through a tape opening 34 located at or near a junction between the front wall 24 and the base 22 of the housing 20. The tape 30 is configured to be pulled out of the housing 20 through the tape opening 34 (as in conventional tape measures) such that indicia 36 on the tape 30 can be used to measure linear distances. Also as in conventional tape measures, the tape 30 is, in one or more embodiments, configured to retract back into the housing 20 in the absence of forces acting to pull the tape 30 out of the housing 20. The tape 30 defines a measuring axis 31 when the tape 30 is extended outward from the tape opening 34 in the housing 20. In one or more embodiments, the measuring axis 31 extends from the distal end 32 of the tape 30 through the first end 21 and the second end 23 of the base 22 of the housing 20 (or along a line near to the first and second ends of the housing 20).

In the illustrative embodiment of squaring tape apparatus 10 depicted in FIGS. 1 and 2, a first corner positioning fixture 40 is attached to the distal end 32 of the tape 30. The first corner positioning fixture 40 is configured to rotate about a first axis 41 relative to the tape 30. The first axis 41 is transverse to the measuring axis 31 as seen in, e.g., FIG. 1. Although described as being transverse, the first axis 41 may or may not be perfectly perpendicular to the measuring axis 31. The first axis 41 is also transverse to a width of the tape 30, where the width of the tape 30 is transverse to the measuring axis 31 and where the width of the tape 30 is measured between opposing edges of the tape 30 that extend along the measuring axis 31, see, e.g., FIG. 2. Again, although described as being transverse, the first axis 41 may or may not be perfectly perpendicular to the width of the tape 30.

In one or more embodiments, the first corner positioning fixture 40 includes a left contact surface 43 located on a left side of the measuring axis 31 and a right contact surface 43 located on a right side of the measuring axis 31 when the tape 30 is used to measure a diagonal distance across a window or door frame. As seen in, e.g., FIG. 2A, the left contact surface 43 contacts framing member 12 and the right contact surface 43 contacts framing member 14 when the tape 30 is extended from the housing such that the first corner positioning fixture 40 is inserted into a first framing corner defined by the framing members 12 and 14.

In one or more embodiments, the first corner positioning fixture 40 includes at least one corner 42 located between adjacent contact surfaces 43 that is configured to be inserted into a first framing corner formed by a first pair of framing members forming a right angle. Rotation of the first corner positioning fixture 40 about the first axis 41 is prevented when the first corner positioning fixture 40 is inserted into the first framing corner.

Although described as having at least one corner 42, one or more embodiments of the first corner positioning fixture 40 that may be used in squaring tape apparatus 10 may be in the form of a square having four corners with all four corners being equidistant from the first axis 41. In one or more embodiments, the shape of the first corner positioning fixture 40 may be described as a projection of the first corner positioning fixture 40 onto a plane parallel with the width of the tape 30, in which case the first corner positioning fixture projection onto that plane would be in the form of a square.

In one or more embodiments, the squaring tape apparatus 10 depicted in FIGS. 1 and 2 includes a second corner positioning fixture 50 attached to the second end 23 of the base 22 of the housing 20. The second corner positioning fixture 50 is configured to rotate about a second axis 51, where the second axis 51 is transverse to the measuring axis 31. Although described as being transverse, the second axis 51 may or may not be perfectly perpendicular to the measuring axis 31. The second axis 51 may be aligned with the first axis 41 which, in one or more embodiments, may mean that the second axis 51 is essentially parallel to the first axis 41. That alignment may, however, not necessarily be perfectly parallel.

In one or more embodiments, the second corner positioning fixture 50 includes a left contact surface 53 located on a left side of the measuring axis 31 and a right contact surface 53 located on a right side of the measuring axis 31 when the tape 30 is used to measure a diagonal distance across a window or door frame. In one or more embodiments, the left contact surface 53 contacts a framing member on the left side of the measuring axis 31 and the right contact surface 53 contacts a framing member on the right side of the measuring axis 31 when the second corner positioning fixture 50 is inserted into a second framing corner that is located diagonally from the first framing corner in a window or door frame. In one or more embodiments, the second corner positioning fixture 50 includes at least one corner 52 located between adjacent contact surfaces 53 that is configured to be inserted into a second framing corner formed by a second pair of framing members forming a right angle. Rotation of the second corner positioning fixture 50 about the first axis 51 is prevented when the second corner positioning fixture 50 is inserted into the second framing corner.

Although described as having at least one corner 52, one or more embodiments of the second corner positioning fixture 50 that may be used in squaring tape apparatus 10 may be in the form of a square having four corners with all four corners being equidistant from the second axis 51. In one or more embodiments, the shape of the second corner positioning fixture 50 may be described as a projection of the second corner positioning fixture 50 onto a plane parallel with the width of the tape 30, in which case the second corner positioning fixture projection onto that plane would be in the form of a square.

With the first corner positioning fixture 40 and the second corner positioning fixture 50 located at opposite ends of the measuring axis 31, the squaring tape apparatus 10 depicted in FIGS. 1 and 2 can be used to measure diagonal distances across a window or door frame opening from inside corner to inside corner. With measurements taken across both diagonals in a rectangular frame opening, the user may determine whether the opening is or is not square before fully securing the window or door within the frame opening.

In one or more embodiments, the first corner positioning fixture 40 and/or the second corner positioning fixture 50 may be configured to rotate 360 degrees about their respective axes 41 and 51. In one or more alternative embodiments, the first corner positioning fixture 40 and/or the second corner positioning fixture 50 may be configured to rotate less than 360 degrees about their respective axes 41 and 51.

In one or more embodiments, the second corner positioning fixture 50 may be spaced apart from the rear wall 26 of the housing 20 of the squaring tape apparatus 10 to facilitate use of the squaring tape apparatus 10 in the measuring of diagonal frame opening distances. In one or more embodiments, the distance between the first end 21 of the base 22 and the second axis 51 is greater than a sum of the length of the base 22 (i.e., the distance from the first end 21 to the second end 23 of the base 22) and the distance between the second axis 51 and the corner 52 of the second corner positioning fixture 50. In such an arrangement, the housing 20 of the squaring tape apparatus 10 may be located further away from the framing corner in which the second corner positioning fixture 50 is located. As a result, use of the squaring tape apparatus 10 may be facilitated because the housing 20 may be easier to manipulate.

In one or more embodiments of the squaring tape apparatus described herein, the indicia 36 on the tape 30 may be configured to indicate the distance between the first axis 41 and the second axis 51 along the measuring axis 31. In one or more alternative embodiments, the indicia 36 on the tape 30 may be configured to indicate a distance along the measuring axis 31 between the corner 42 of the first corner positioning fixture 40 and the corner 52 of the second corner positioning fixture 50 when the first corner positioning fixture 40 is located in a first framing corner and the second corner positioning fixture 50 is located in a second framing corner diagonally from the first framing corner.

One alternative illustrative embodiment of a squaring tape apparatus that may be provided in accordance with the principles described herein is depicted in FIGS. 3 and 4. The squaring tape apparatus 110 is constructed similarly to the squaring tape apparatus 10 described above in connection with FIGS. 1 and 2. In particular, the squaring tape apparatus 110 includes a housing 120 containing a tape 130 coiled therein with the tape 130 extending outward from the housing 120 (which includes front wall 124).

The squaring tape apparatus 110 also includes a first corner positioning fixture 140 attached to the tape 130, with the first corner positioning fixture 140 rotating about a first axis 141.

The housing 120 of the squaring tape apparatus 110 includes a base 122 having a first end 121 and a second end 123. An arm 156 is attached to the second end 123 of the base 122 of the housing 120, with the arm 156 rotating about an axis 154 such that the arm can be located in a stored position in which the arm 156 is located against the rear wall 126 of the housing 120 as seen in FIG. 3.

The arm 156 can, however, be rotated downward to a position in which the arm 156 is aligned with the base 122 along a measuring axis 131 as depicted in FIG. 4. Rotating the arm 156 downward to this position, locates the second corner positioning fixture 150 along the measuring axis 131. As described above in connection with squaring tape apparatus 10, the second corner positioning fixture 150 is also configured to rotate about a second axis 151.

The illustrative embodiment of squaring tape apparatus 110 is a variation in which the second corner positioning fixture 150 can be stored when the squaring tape apparatus 110 is not in use.

Although, in one or more embodiments, the squaring tape apparatus described herein may be dedicated for use in measuring diagonal distances across a frame opening, the principles of the invention as described herein may also be employed using a conventional tape measure modified by a kit that is configured to convert a conventional tape to a squaring tape apparatus as described herein. One illustrative embodiment of such a kit is depicted and will be described in connection with FIGS. 5 to 8. Such kits may typically be provided in a package that includes the components required to convert a conventional tape measure to a squaring tape apparatus as described herein.

In one or more embodiments, the kit may include a first corner positioning fixture apparatus 260 configured to attach to a distal end of measuring tape contained within a housing. The first corner positioning fixture apparatus 260 includes a first corner positioning fixture 240 configured to rotate about a first axis 241 relative to the measuring tape on which the first corner positioning fixture apparatus 260 is located. The first axis 241 is transverse to a measuring axis 231 defined along a length of the measuring tape on which the first corner positioning fixture apparatus 260 is located. The first axis 241 is also transverse to a width of the measuring tape on which the first corner positioning fixture apparatus 260 is located (where the width of the measuring tape is transverse to the measuring axis 231). The first corner positioning fixture 240 includes a corner 242 that can be used as described herein in connection with the first corner positioning fixtures in the dedicated squaring tape apparatus.

The first corner positioning fixture apparatus 260 includes a slot 264 including extensions 265 that are configured to receive a conventional measuring tape in a manner that retains the first corner positioning fixture apparatus 260 attached to the distal end of such a measuring tape. These features can be seen in, e.g., the cross-sectional view of FIG. 6, which is a cross-section of the first corner positioning fixture apparatus 260 taken along line 6-6 in FIG. 5. In such an embodiment, the first corner positioning fixture apparatus 260 may be retained on the measuring tape by friction or other forces. In one or more alternative embodiments, however, the first corner positioning fixture apparatus 260 may be retained on a measuring tape through the use of any suitable technique, e.g., mechanical fasteners, adhesives, clamps, etc. In one or more alternative embodiments, the hook on the end of a conventional measuring tape may be used to secure the first corner positioning fixture apparatus on the measuring tape.

In one or more embodiments of a kit configured to convert a conventional tape measure to a squaring tape apparatus as described herein, the kit may further include a second corner positioning fixture apparatus 270 configured to attach to the housing 220 of a conventional tape measure. The second corner positioning fixture apparatus 270 may, in one or more embodiments, position a second corner positioning fixture 250 along the measuring axis 231 defined by that conventional tape measure, such that a base of the housing 220 of the conventional tape measure is located between the second corner positioning fixture 250 and the first corner positioning fixture (attached to the distal end of the measuring tape of the tape measure using, e.g., a first corner positioning fixture apparatus as described herein).

The second corner positioning fixture apparatus 270 may, in one or more embodiments, include a slot 272 configured to receive the housing 220 of the conventional tape measure. In the depicted embodiment, the slot 272 includes two sidewalls 274 and a rear wall 276. In one or more embodiments, the conventional tape measure housing 220 may be retained in the slot 272 by friction. In one or more alternative embodiments, however, the conventional tape measure housing 220 may be retained in the slot 272 by one or more of the following techniques, e.g., mechanical fasteners, adhesives, clamps, etc.

Furthermore, in one or more alternative embodiments of the kits described herein, a second corner positioning fixture apparatus may or may not include a slot configured to receive the housing 220 of a conventional tape measure. For example, the base of the slot 272 may be adhesively or otherwise attached rectally to the base of the tape measure housing 220 in the absence of any walls forming a slot to receive the housing 220.

The second corner positioning fixture 250 of the second corner positioning fixture apparatus 270 is configured to rotate about a second axis 251 in much the same manner as described in connection with the second corner positioning fixtures in the dedicated squaring tape apparatus described herein. In particular, the second axis 251 is transverse to the measuring axis 231 and, in one or more embodiments, aligned with the first axis 241 about which the first corner positioning fixture 240 rotates when attached to the distal end of the measuring tape.

When both the first corner positioning fixture apparatus 260 and the second corner positioning fixture apparatus 270 are attached to a conventional tape measure, the first corner positioning fixture 240 and the second corner positioning fixture 250 can be used to measure distances between diagonal framing corners in a frame opening as discussed herein.

The corner positioning fixtures that may be used in connection with the squaring tape apparatus and kits described herein may take a variety of different forms. Some illustrative examples of corner positioning fixtures having different shapes are depicted in connection with FIGS. 9-14 and will be described herein. These illustrative examples are not, however, exhaustive, and other shapes may be used for corner positioning fixtures in the squaring tape apparatus and kits described herein.

Figure 9:
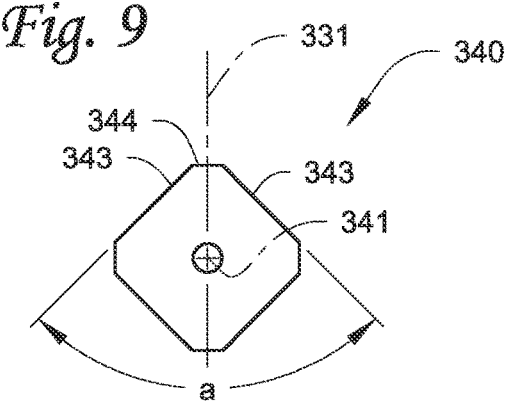
FIG. 9 depicts another illustrative embodiment of a corner positioning fixture that may be used in the squaring tape apparatus and kits as described herein.

Referring to FIG. 9, one illustrative embodiment of a corner positioning fixture 340 is depicted which is in the form of a square having four contact surfaces 343. The corner positioning fixture 340 is attached to the squaring tape apparatus in a manner that allows the corner positioning fixture 340 to rotate about axis 341 as described herein in connection with other illustrative embodiments of corner positioning fixtures. In many respects, the corner positioning fixture 340 is similar to the corner positioning fixtures 40 and 50 depicted and described in connection with squaring tape apparatus 10 in FIGS. 1-2A.

One difference, however, between corner positioning fixture 340 and, for example, corner positioning fixture 40, is that corner positioning fixture 340 includes chamfered corners 344 between adjacent pairs of contact surfaces 343 that make up the corner positioning fixture 340.

Another feature that is depicted in connection with the illustrative embodiment of corner positioning fixture 340 in FIG. 9 is the angle a that defines the contact surfaces 343 located on the left and right sides of measuring axis 331 when the vertex a' of angle a is located on the measuring axis 331. Furthermore, in one or more embodiments, angle a is bisected by the measuring axis 331 when the vertex a' of the angle a is located on the measuring axis 331.

Figure 10:
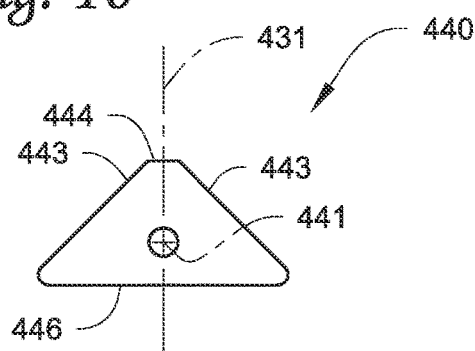
FIGS. 10-12 depict another illustrative embodiment of a corner positioning fixture that may be used in the squaring tape apparatus and kits as described herein.
Figure 11:
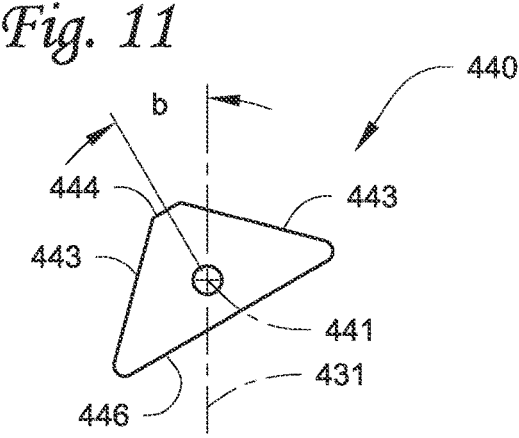
Figure 12:
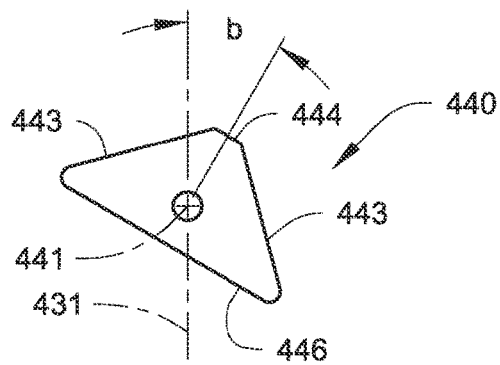

Another illustrative embodiment of a corner positioning fixture 440 is depicted in FIGS. 10-12. In particular, the illustrative embodiment of corner positioning fixture 440 is largely in the shape of a triangle (as opposed to a square shaped corner positioning fixture such as that depicted in connection with, e.g., FIGS. 1, 2, and 9). The corner positioning fixture 440 includes left and right contact surfaces 443 and a backside 446. The left and right side contact surfaces 443 may, in one or more embodiments, not meet each other along one vertex of the triangle but may, rather, be separated by a chamfered corner 444 similar to that depicted in connection with the corner positioning fixture 340 of FIG. 9.

In one or more embodiments, the left and right contact surfaces 443 may be arranged relative to each other such that the left and right contact surfaces 443 are defined by an angle of 80° or more. In one or more embodiments, the left and right contact surfaces 443 may be arranged relative to each other such that the left and right contact surfaces 443 are defined by an angle of 100° or less. In one or more embodiments, the left and right contact surfaces 443 may be arranged relative to each other such that the left and right contact surfaces 443 are defined by an angle of 90° (in which case the shape of the corner positioning fixture may be generally described as a right triangle—in which the corner forming the right angle has been chamfered, and in which the backside 446 forms the hypotenuse of the right triangle).

Although, in one or more embodiments, the corner positioning fixtures used in the tape apparatus and kits described herein may rotate 360° about their respective axes, the corner positioning fixture 440 depicted in FIGS. 10-12 may have a more limited rotation about its axis 441. In part, the more limited rotation of corner positioning fixture 440 may be required by its shape to provide repeatable measuring of diagonal frame distances, particularly when the left and right contact surfaces 443 are arranged relative to each other such that they form an angle between 80° to 100°, similar to the angles seen in, e.g., the square corner positioning fixtures described herein and where the angles between the left and right contact surfaces 443 and the backside 446 are outside of the range of 80° to 100°.

The corner positioning fixture 440 is depicted in FIG. 10 in an orientation with respect to measuring axis 431 in which an angle formed by the left and right contact surfaces 443 would be bisected by the measuring axis 431 when the vertex of that angle was located on the measuring axis 431. Clockwise rotation of the corner positioning fixture 440 about its axis 441 is depicted in FIG. 11, with the corner positioning fixture 440 rotated to the right by angle b. Counterclockwise rotation of the corner positioning fixture 440 about its axis 441 is depicted in FIG. 12, with the corner positioning fixture 440 rotated to the left by angle b.

In one or more embodiments, the rotation of corner positioning fixture 440 about axis 441 may be limited such that the corner positioning fixture 440 rotates less than 360° about axis 441 (where the sum of both angles b defines the amount of rotation allowed for the corner positioning fixture 440). Although the corner positioning fixture 440 may rotate by an equal amount clockwise and counterclockwise as depicted in connection with the illustrative embodiment of corner positioning fixture 440, equal rotation in both directions is not required. In one or more embodiments (such as, e.g., the embodiment depicted in FIGS. 10-12), the corner positioning fixtures (such as, e.g., corner positioning fixture 440) described herein may rotate about their respective axes over a range of, e.g., 120° or less, 90° or less, or 60° or less. In one or more embodiments, the corner positioning fixtures described herein may, however, rotate by at least some amount about their respective axes at least, e.g., 10° or more, 20° or more, or 40° or more.

Figure 13:
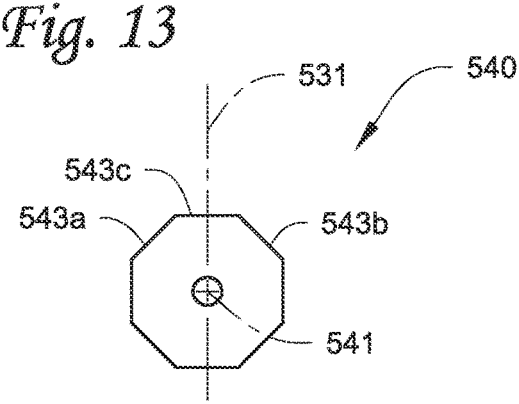
FIG. 13 depicts another illustrative embodiment of a corner positioning fixture that may be used in the squaring tape apparatus and kits as described herein.

Another illustrative embodiment of a corner positioning fixture 540 is depicted in FIG. 13. The corner positioning fixture 540 is in the form of an octagon that rotates about an axis 541. In one or more embodiments in which the octagonal form of the corner positioning fixture 540 is in the form of a regular octagon, the corner positioning fixture 540 may include contact surfaces 543*a* and 543*b* that are separated from each other around the perimeter of the octagon by an intervening contact surface 543*c*. In embodiments in which the octagon is a regular octagon, contact surfaces 543*a* and 543*b* would form a right angle, i.e., are oriented orthogonal to each other.

Figure 14:
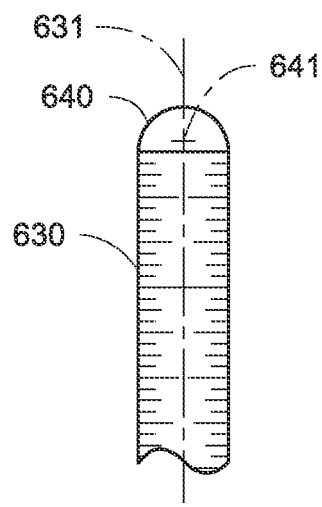
FIG. 14 depicts another illustrative embodiment of a corner positioning fixture that may be used in the squaring tape apparatus and kits as described herein.
Figure 15:
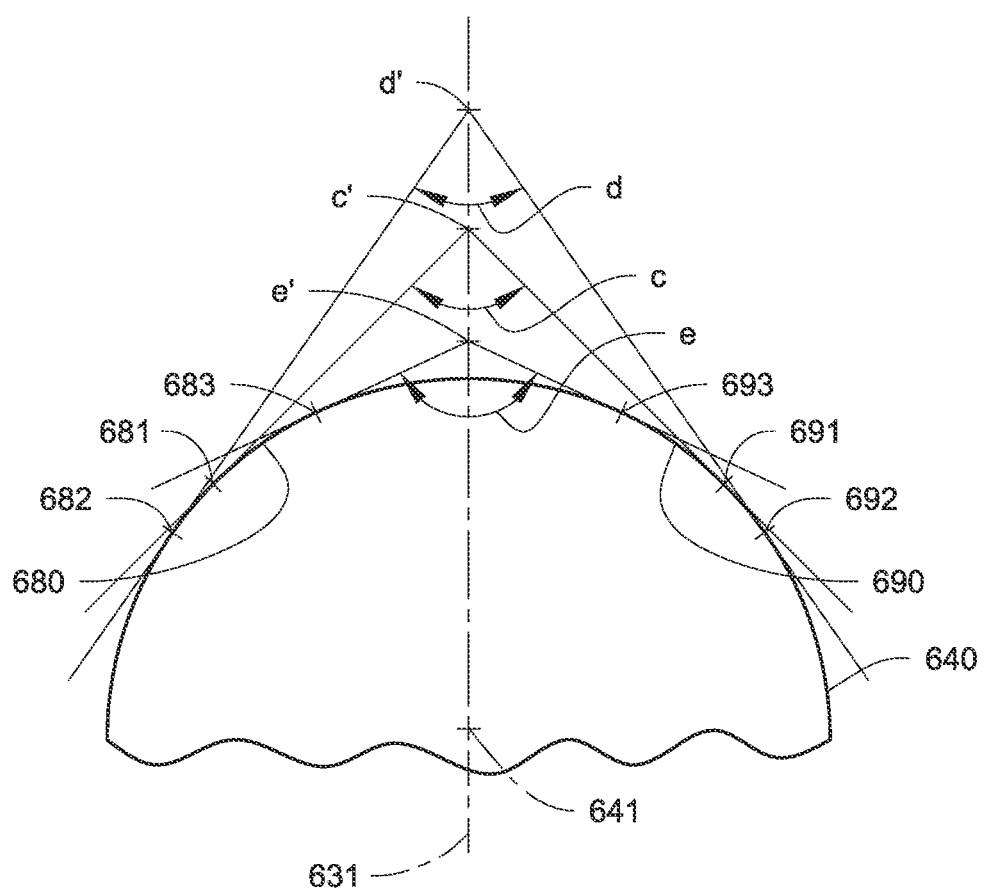
FIG. 15 is an enlarged view of the corner positioning fixture of FIG. 14.

Still another variation in the shape of a corner positioning fixture used in the squaring tape apparatus and kits described herein is depicted in connection with the illustrative embodiment of FIGS. 14 and 15. In particular, the corner positioning fixture 640 at the end of tape 630 has, in one or more embodiments, a generally rounded shape and may be provided in the form of, e.g., a generally circular disk, a spherical ball, semicircular disk, semi-spherical ball, etc. regardless of the particular form of the corner positioning fixture, when viewed in a plane aligned with the width of the tape to which the corner positioning fixture is attached, the corner positioning fixture will define arcuate surfaces described herein.

In one or more embodiments in which the corner positioning fixture 640 at the end of a tape 630 has a generally rounded or circular disk-like shape, the corner positioning fixture 640 may not need to rotate relative to any axis in order to position the corner positioning fixture 640 in a framing corner in a manner that allows for accurate inside corner measurements of diagonal distances across a window or door frame opening.

The generally rounded shape of the corner positioning fixtures 640 at the end of tape 630 may or may not be in the form of a semi-circle, but may, in one or more embodiments, include both left and right circular arcuate surfaces as described herein. In particular, the corner positioning fixture 640 may include a left circular arcuate surface 680 located on the left side of the measuring axis 631 and a right circular arcuate surface 690 located on the right side of the measuring axis 631.

The left circular arcuate surface 680 would contact a framing member on the left side of the measuring axis 631, while the right circular arcuate surface 690 would contact a framing member on the right side of the measuring axis 631 when the corner positioning fixture 640 is inserted into a framing corner defined by the framing members located on the left and right sides of the measuring axis 631. The left and right circular arcuate surfaces 680 and 690 may be arcuate portions of a circle having its center located on the measuring axis 631, with the circle being located in a plane defined by the measuring axis 631 and the width of the tape 630 when extended out of the housing of a squaring tape apparatus as described herein.

In one or more embodiments, the left circular arcuate surface 680 may have endpoints that are defined by a pair of angles, where the pair of angles each have a vertex that lies on the measuring axis 631 of the tape 630 past the distal end of the tape 630. As depicted in FIG. 15, a right angle c having a vertex c' intersects the perimeter of the corner positioning fixture 640 at points 681 and 691. This angle represents a framing corner that includes framing members oriented perpendicular to each other.

However, the squaring tape apparatus described herein is used in situations in which the framing corner does not form a right angle. For example in some instances the angle formed by the framing members may be less than 90°. As a result, the corner positioning fixtures 640 will, in one or more embodiments, include left and right circular arcuate surfaces that are capable of positioning the corner positioning fixture properly in such a framing corner. Angle d as depicted in FIG. 15 is less than 90°, has a vertex d' located on the measuring axis 631, and is bisected by the measuring axis 631. As a result, angle d contacts the left and right circular arcuate surfaces 680 and 690 at points 682 and 692 on the perimeter of the corner positioning fixture 640. Points 682 and 692 are located further away from the measuring axis 631 than points 681 and 691 at which a right angle would contact the left and right circular arcuate surfaces 680 and 690. Furthermore, points 682 and 692 are also located further away from the distal end of the corner positioning fixture 640, i.e., the location at which the measuring axis 631 intersects the corner positioning fixture 640.

While angle d represents a situation in which the framing members meet at an angle less than 90°, angle e having a vertex e' and being bisected by the measuring axis 631 represents a situation in which the framing members meet at an angle that is greater than 90°. As a result, angle e contacts the left and right circular arcuate surfaces 680 and 690 at locations closer to the distal end of the corner positioning fixture 640, i.e., the location at which the measuring axis 631 intersects the corner positioning fixture 640. In particular, the left and right circular arcuate surfaces are contacted at points 683 and 693 along the perimeter of the corner positioning fixture 640.

In one or more embodiments of the corner positioning fixtures described herein, the left circular arcuate surface 680 may be defined by endpoints 682 and 683, while the right circular arcuate surface 690 may be defined by endpoints 692 and 693. Those endpoints may, in one or more embodiments, be defined by angles having their vertices on the measuring axis and which are also bisected by the measuring axis. In one or more embodiments, angle d defining the endpoints of the left and right circular arcuate surfaces that are further from the distal end of the corner positioning fixture 640 and the measuring axis 631 may be 60° or more, 70° or more, or 80° or more. In one or more embodiments, angle e defining the endpoints of the left and right circular arcuate surfaces that are closer to the distal end of the corner positioning fixture 640 and the measuring axis 631 may be less than 180°, 160° or less, 140° or less, or 120° or less.

It should be noted that the shape of the perimeter of the corner positioning fixture 640 between points 683 and 693 may, in one or more embodiments, be unimportant. For example, in one or more embodiments the perimeter of the corner positioning fixture 640 may be flat between endpoints 683 and 693. Further, in one or more embodiments, the perimeter of the corner positioning fixture 640 between endpoints 683 and 693 may not extend past a perimeter that would be defined by a circle on which both the left and right circular arcuate surfaces 680 and 690 lie.

Figure 16:
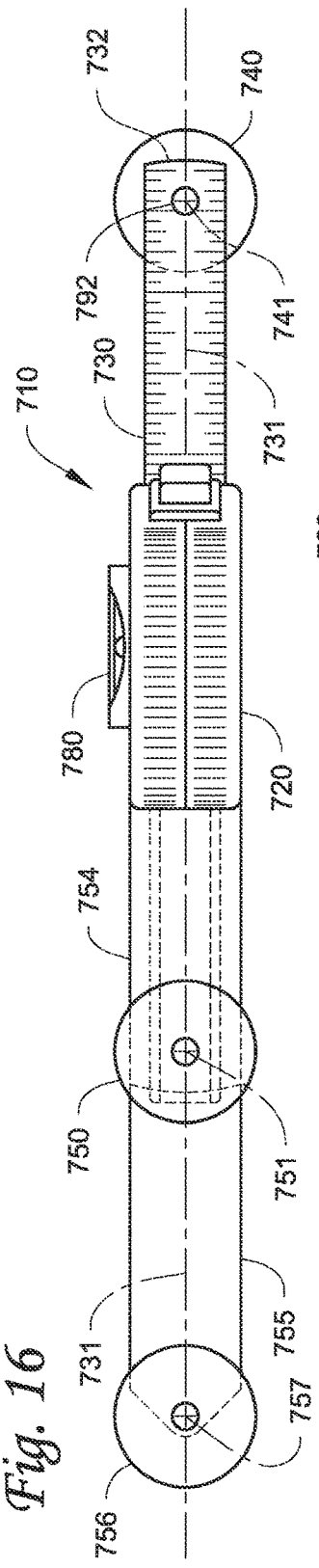
FIG. 16 is a top view of another illustrative embodiment of a squaring tape apparatus as described herein including an extension arm attached thereto.
Figure 17:
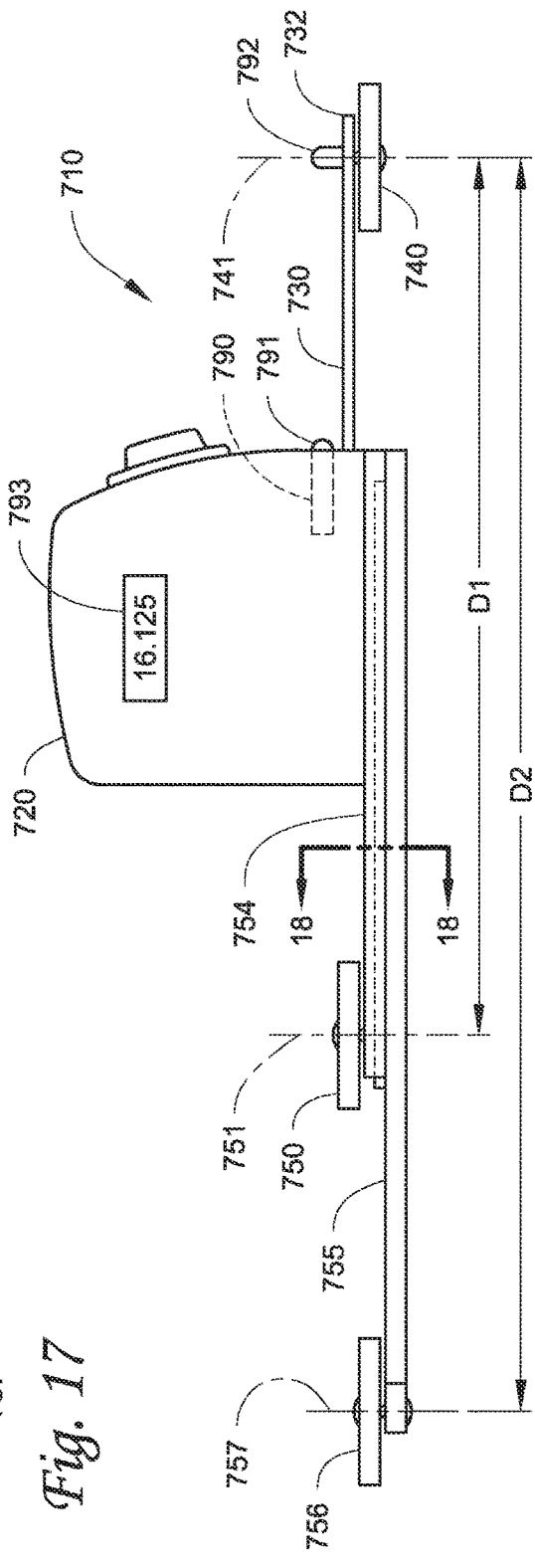
FIG. 17 is a side view of the squaring tape apparatus depicted in FIG. 16.
Figure 18:
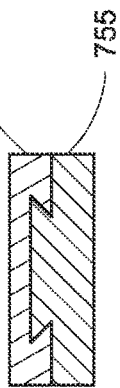
FIG. 18 is a cross-sectional view of the interface between the squaring tape apparatus and the extension arm taken along line 18-18 in FIG. 17.

Another illustrative embodiment of a squaring tape apparatus 710 as described herein is depicted in FIGS. 16-18. The apparatus 710 includes a housing 720 with a tape 730 coiled within the housing 720 as described herein in connection with other illustrative embodiments.

In the illustrative embodiment of squaring tape apparatus 710 depicted in FIGS. 16 and 17, a first corner positioning fixture 740 is attached to the distal end 732 of the tape 730. The first corner positioning fixture 740 is, in the illustrative embodiment depicted in FIGS. 16 and 17, in the form of a generally circular disc that provides left and right circular arcuate surfaces on each side of the measuring axis 731 as described herein in connection with, e.g., the illustrative embodiment of a corner positioning fixture depicted and described in connection with FIGS. 14 and 15.

The illustrative embodiment of squaring tape apparatus 710 also includes a second corner positioning fixture 750 that is attached to the housing 720 by an armed 754 in a manner similar to that discussed in connection with other illustrative embodiments described herein. The second corner positioning fixture 750 is also in the form of a generally circular disk that also provides left and right circular arcuate surfaces on each side of the measuring axis 731 as described herein in connection with, e.g., the illustrative embodiment of a corner positioning fixture depicted and described in connection with FIGS. 14 and 15.

Both the first corner positioning fixture 740 and the second corner positioning fixture 750 have, when in the form of circular discs, have a center through which axes 741 and 751 extend. When in use, the axes 741 and 751 can be used to determine a distance (D1) between, for example, diagonally opposed corners in a frame opening.

An additional optional feature depicted in connection with the squaring tape apparatus 710 is an extension arm 755 that can be used to provide a third corner positioning fixture 756 that is located farther away from the housing 720 and the second corner positioning fixture 750. This arrangement may be useful, in some instances, where, for example, the squaring tape apparatus 710 is being used to determine a diagonal measurement where it may be more convenient to locate the housing 720 farther away from one of the diagonally opposing corners. For example, if the squaring tape apparatus 710 were being used to measure a diagonal distance within a door opening, use of the extension arm 755 may allow user to more easily determine the diagonal measurement without requiring the user to, for example, kneel down to read the measurement.

Like the first corner positioning fixture 740 and the second corner positioning fixture 750, the third corner positioning fixture 756 may also be in the form of a generally circular disk having a center through which an axis 757 extends. In one or more embodiments in which an extension arm 755 is used, the difference in the distance between the axes 741 and 751 (D1) and the distance between the axes 741 and 757 (D2) may be known. For example, the extension arm 755 may provide a fixed distance (e.g., 6 inches, 12 inches, 18 inches, etc.) between the axis 751 and axis 757 that can be added to any distance measured using the squaring tape apparatus 710.

Although the illustrative embodiment depicted in FIGS. 16-17 includes an extension arm 755 attached to an existing extension arm 754 which is, in turn, attached to the housing 720 of the squaring tape apparatus 710, in one or more alternative embodiments, the extension arm 754 may simply be removed from the housing 720 and replaced by the longer extension arm 755 which may then be directly attached to the housing 720. As a result, for purposes of the present invention, the second corner positioning fixture may simply be the corner positioning fixture are located furthest from the housing of a squaring tape apparatus described herein on the opposite side of the first corner positioning fixture.

The extension arm 755 may be attached to the existing squaring tape apparatus 710 by any suitable technique or combination of techniques, e.g., adhesives, mechanical fasteners, clamps, etc. In the depicted embodiment the extension arm 755 may include features that are complementary to features found in the arm 754 such that a slot and key arrangement may be provided as seen in, e.g., the cross-sectional view of FIG. 18. In such an arrangement, frictional forces as well as a mechanically interlocking connection are used to retain the extension arm 755 in a selected position relative to the housing 720 of the squaring tape apparatus 710. As discussed herein, however, many different techniques could be used to attach an extension arm such as extension arm 755 to a squaring tape apparatus 710.

In one or more embodiments, the squaring tape apparatus as described herein may include an optical measuring system which, in the depicted embodiment of squaring tape apparatus 710, may take the form of a laser rangefinder 790 having a lens 791 directed at a target 792 located at or near the distal end 732 of the tape 730. In use, the laser rangefinder 790 can be used to detect a distance between the target 792 and the lens 791. In one or more embodiments, the laser rangefinder 790 may be operably coupled to a display 793 that is configured to provide an indication of distance between the laser rangefinder 790 and target 792. In one or more alternative embodiments, the laser rangefinder 790 may be configured to provide a distance using display 793 that is indicative of a distance between target 792

(which, in the depicted embodiment, is located on axis 741) and the corner positioning apparatus located along a measuring axis 731 on the opposite side of the housing 720. For example, in one or more embodiments, the laser rangefinder 790 may provide a distance D1 or D2.

Another optional feature that may be provided in connection with one or more embodiments of the squaring tape apparatus described herein is depicted in connection with the illustrative embodiment of squaring tape apparatus 710 and is in the form of a level indicator 780 that may be located on a side of the housing 720. In embodiments in which the side of the housing 720 on which the level indicator 780 is located is aligned with measuring axis 731, the level indicator 780 can be used to determine when the measuring axis 731 is in a horizontal position so that the width of openings can be measured using the squaring tape apparatus described herein.

As described above in connection with FIGS. 5-8, the principles of the invention as described herein may also be employed using a conventional tape measure modified by a kit that is configured to convert the conventional tape measure to a squaring tape apparatus as described herein. Another illustrative embodiment of such a kit is depicted and will be described in connection with FIGS. 19 to 20. Such kits may typically be provided in a package that includes the components required to convert a conventional tape measure to a squaring tape apparatus as described herein.

In one or more embodiments, the kit depicted in FIGS. 19-20 may include a first corner positioning fixture apparatus 860 configured to attach to a distal end of measuring tape 830 contained within the housing 820. The first corner positioning fixture apparatus 860 includes a first corner positioning fixture 840 which, in the depicted embodiment, is in the form of a generally circular disk similar to the corner positioning fixtures described above in connection with FIGS. 14-18. The first corner positioning fixture 840 has a center through which first axis 841 extends. The first axis 841 is transverse to a measuring axis 831 defined along a length of the measuring tape on which the first corner positioning fixture apparatus 860 is located. The first axis 841 is also transverse to a width of the measuring tape on which the first corner positioning fixture apparatus 860 is located (where the width of the measuring tape is transverse to the measuring axis 831).

The first corner positioning fixture apparatus 860 includes a slot 862 that is configured to receive the conventional measuring tape 830 in a manner that retains the first corner positioning fixture apparatus 860 attached to the distal end of the measuring tape 830. In particular, the measuring tape 830 terminates at its distal end 832 in a hook 839 similar to conventional tape measures. In the depicted embodiment, the measuring tape 830 is doubled back on itself within the slot 862 formed in the first corner positioning fixture apparatus 860. When the first corner positioning apparatus 860 is no longer needed, the measuring tape 830 can be moved from the slot 862 and used in a conventional manner.

It should be understood that the first corner positioning fixture apparatus 860, although depicted as abutting the housing 820, can be moved along the measuring axis 831 away from the housing 820 when the squaring tape apparatus 810 is being used, i.e., the first corner positioning fixture apparatus 860 is not connected to the housing 820, but is rather connected to the measuring tape 830.

In one or more embodiments of a kit configured to convert a conventional tape measure to a squaring tape apparatus as described herein, the kit may further include a second corner positioning fixture apparatus 870 configured to attach to the housing 820 of a conventional tape measure. The second corner positioning fixture apparatus 870 may, in one or more embodiments, position a second corner positioning fixture 850 along the measuring axis 831 defined by that conventional tape measure as it is extended away from the housing 820, such that a base of the housing 820 of the conventional tape measure is located between the second corner positioning fixture 850 and the first corner positioning fixture (attached to the distal end of the measuring tape of the tape measure using, e.g., a first corner positioning fixture apparatus as described herein).

The second corner positioning fixture apparatus 870 may take a variety of forms, some of which are described above in connection with FIGS. 5-8. In the depicted embodiment, the second corner positioning fixture apparatus 870 includes an arm 854 attached to the housing 820 by any suitable technique or combination of techniques.

When both the first corner positioning fixture apparatus 860 and the second corner positioning fixture apparatus 870 are attached to the housing 820 of a conventional tape measure, the first corner positioning fixture 840 and the second corner positioning fixture 850 can be used to measure distances between diagonal framing corners in a frame opening as discussed herein (such as, e.g., distance D3 between axes 841 and 851 in FIG. 19).

Figure 21:
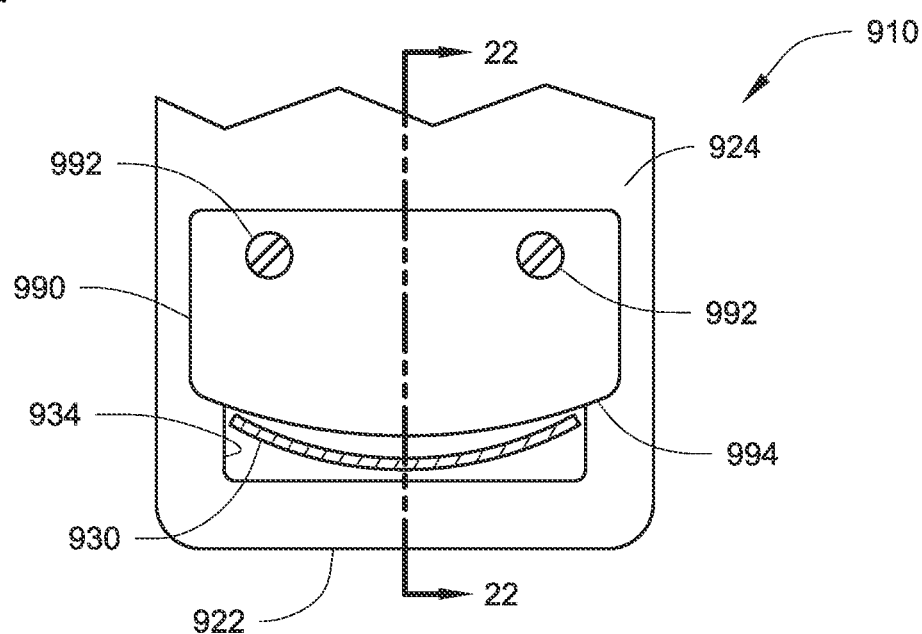
FIG. 21 is an enlarged partial view of another illustrative embodiment of a squaring tape apparatus including measurement guide located above the measuring tape.
Figure 22:
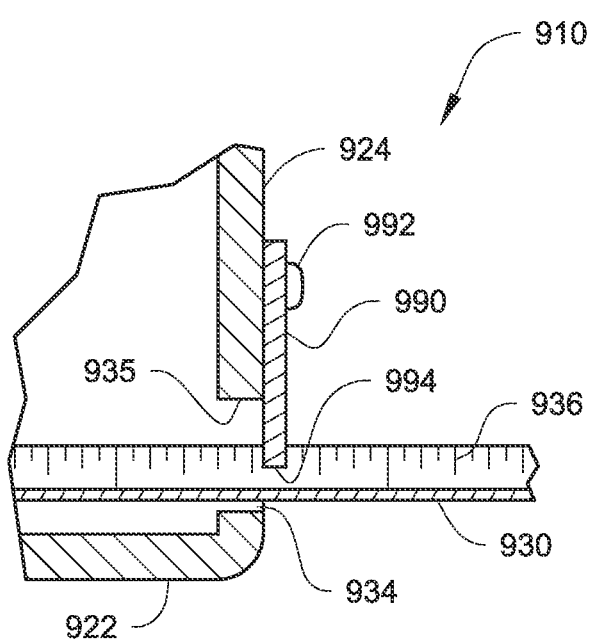
FIG. 22 is a cross-sectional view of the squaring tape apparatus as depicted in FIG. 21 taken along line 22-22 in FIG. 21.

Another optional feature that may be included in one or more embodiments of the squaring tape apparatus described herein is a measurement guide that may allow for more accurate measurement using the squaring tape apparatus described herein. One illustrative embodiment of such a measurement guide is depicted in connection with FIGS. 21 and 22. The squaring tape apparatus 910 depicted in FIG. 21 has a base 922 and a front wall 924, with the measuring tape 930 extending out of a tape opening 934 formed in the front wall 924. The measurement guide 990 is, in the depicted embodiment, located above the measuring tape 930 includes a bottom edge 994 closest to the top surface of the measuring tape 930. The measurement guide may, in one or more embodiments, be attached to the front wall 924 of the squaring tape apparatus 910 using fasteners 992 or any other suitable attachment technique and/or mechanism.

Because the bottom edge 994 of the measurement guide 990 is closer to the top surface of the measuring tape 930 than the bottom edge 935 of the tape opening 934, a user may be able to more accurately determine a measurement using the squaring tape apparatus 910 because the bottom edge 994 of the measurement guide 990 is located closer to the measurement indicia 936 on the measuring tape 930. Other measurement guides may, of course, be substituted for the depicted illustrative embodiment. For example, in one or more embodiments, an arm may be fixed or otherwise attached to the housing so that it may be located closer to the top surface of the measuring tape when needed and such an arm may be moved into place or moved out of place as desired by a user.

The complete disclosure of any patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the squaring tape apparatus and kits, as well as related methods, are discussed and reference has been made to possible variations. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. Accordingly, the invention is to be limited only by the claims provided below and equivalents thereof. It should also be understood that this invention also may be suitably practiced in the absence of any element not specifically disclosed as necessary herein.

What is claimed is:

1. A squaring tape apparatus comprising:
a housing comprising a base that comprises a first end and a second end, a front wall extending upward from the first end of the base, a rear wall extending upward from the second end of the base, and two sidewalls extending between the front wall and the rear wall, the two sidewalls extending upward from the base;
a tape coiled within the housing, the tape comprising a distal end that exits the housing through a tape opening located at a junction between the front wall and the base, wherein the tape is configured to be pulled out of the housing through the tape opening, and wherein the measuring tape is configured to retract back into the housing in the absence of forces acting to pull the tape out of the housing, and wherein the tape defines a measuring axis extending through the distal end and along a length of the tape when the tape is extended outward from the tape opening, and further wherein the tape comprises opposing edges extending along the measuring axis, the opposing edges defining a width measured transverse to the measuring axis;
a first corner positioning fixture at the distal end of the tape, wherein the first corner positioning fixture is configured to rotate about a first axis relative to the tape, wherein the first axis is transverse to the measuring axis and transverse to the width of the tape, and wherein the first corner positioning fixture comprises a left contact surface located on a left side of the measuring axis and a right contact surface located on a right side of the measuring axis, wherein the left and right contact surfaces are defined by a first angle that is bisected by the measuring axis when the vertex of the first angle is located on the measuring axis, and wherein the left contact surface contacts a first framing member and the right contact surface contacts a second framing member when the tape is extended from the housing such that the first corner positioning fixture is inserted into a first framing corner defined by the first and second framing members; and
a second corner positioning fixture attached to the housing such that the housing is located between the second corner positioning fixture and the first corner positioning fixture along the measuring axis, wherein the second corner positioning fixture is configured to rotate about a second axis, wherein the second axis is transverse to the measuring axis and aligned with the first axis, and wherein the second corner positioning fixture comprises a left contact surface located on a left side of the measuring axis and a right contact surface located on a right side of the measuring axis, wherein the left and right contact surfaces are defined by a second angle that is bisected by the measuring axis when the vertex of the second angle is located on the measuring axis, and wherein the left contact surface contacts a third framing member and the right contact surface contacts a fourth framing member when the second corner positioning fixture is inserted into a second framing corner defined by the third and fourth framing members, wherein the second framing corner is located diagonally opposite from the first framing corner, wherein the squaring tape apparatus is configured to measure a distance between the first and second framing corners.

2. An apparatus according to claim 1, wherein the first angle is within a range of 80 to 100 degrees.

3. An apparatus according to claim 2, wherein the first angle is a right angle.

4. An apparatus according to claim 1, wherein the first corner positioning fixture is configured to rotate 360 degrees about the first axis.

5. An apparatus according to claim 1, wherein the first corner positioning fixture is configured to rotate less than 360 degrees about the first axis.

6. An apparatus according to claim 1, wherein the second angle is within a range of 80 to 100 degrees.

7. An apparatus according to claim 6, wherein the second angle is a right angle.

8. An apparatus according to claim 1, wherein the second corner positioning fixture is configured to rotate 360 degrees about the second axis.

9. An apparatus according to claim 1, wherein the second corner positioning fixture is configured to rotate less than 360 degrees about the second axis.

10. An apparatus according to claim 1, wherein a projection of the first corner positioning fixture onto a plane parallel with the width of the tape is in the form of a square with chamfered corners, wherein the left and right contact surfaces of the first corner positioning fixture form adjacent sides of the square.

11. An apparatus according to claim 1, wherein a projection of the second corner positioning fixture onto a plane parallel with the width of the tape is in the form of a second square with chamfered corners, wherein the left and right contact surfaces of the second corner positioning fixture form adjacent sides of the second square.

12. An apparatus according to claim 1, wherein the first corner positioning fixture is configured to rotate 120 degrees or less about the first axis, and wherein a projection of the first corner positioning fixture onto a plane parallel with the width of the tape is in the form of a triangle with a chamfered corner distal from the housing, and further wherein the chamfered corner moves between right and left sides of the measuring axis as the first corner positioning block rotates about the first axis.

13. An apparatus according to claim 1, wherein the second corner positioning fixture is configured to rotate less than 360 degrees about the second axis, and wherein a projection of the second corner positioning fixture onto a plane parallel with the width of the tape is in the form of a triangle with a chamfered corner distal from the housing, and further wherein the chamfered corner moves between right and left sides of the measuring axis as the second corner positioning block rotates about the second axis.

14. An apparatus according to claim 1, wherein a distance between the first end of the base and the second axis is greater than a distance between the first end and the second end of the base.

15. An apparatus according to claim 1, wherein the apparatus comprises a third corner positioning fixture attached to the housing such that the second corner positioning fixture is located between the third corner positioning fixture and the housing along the measuring axis, wherein the third corner positioning fixture comprises a left contact surface located on a left side of the measuring axis and a right contact surface located on a right side of the measuring axis, wherein the left and right contact surfaces are defined by an angle that is bisected by the measuring axis when the vertex of the angle is located on the measuring axis, and wherein the left contact surface contacts the third framing member and the right contact surface contacts the fourth framing member when the third corner positioning fixture is inserted into the second framing corner.

16. An apparatus according to claim 1, wherein the tape comprises visible measurement indicia on a surface thereof that is configured to indicate a distance between the first axis and the second axis along the measuring axis.

17. A squaring tape apparatus comprising:
a housing comprising a base that comprises a first end and a second end, a front wall extending upward from the first end of the base, a rear wall extending upward from the second end of the base, and two sidewalls extending between the front wall and the rear wall, the two sidewalls extending upward from the base;
a tape coiled within the housing, the tape comprising a distal end that exits the housing through a tape opening located at a junction between the front wall and the base, wherein the tape is configured to be pulled out of the housing through the tape opening, and wherein the tape is configured to retract back into the housing in the absence of forces acting to pull the tape out of the housing, and wherein the tape defines a measuring axis extending through the distal end and along a length of the tape when the tape is extended outward from the tape opening, and further wherein the tape comprises opposing edges extending along the measuring axis, the opposing edges defining a width measured transverse to the measuring axis;
a first corner positioning fixture at the distal end of the tape, wherein the first corner positioning fixture comprises a left circular arcuate surface located on a left side of the measuring axis and a right circular arcuate surface located on a right side of the measuring axis, wherein the left and right circular arcuate surfaces are defined by a first circle having a first center on the measuring axis proximal from the distal end of the tape, wherein the left circular arcuate surface contacts a first framing member and the right circular arcuate surface contacts a second framing member when the tape is extended from the housing such that the first corner positioning fixture is inserted into a first framing corner defined by the first and second framing members, wherein the circle is located in a plane defined by the measuring axis and the opposing edges of the tape when extended out of the housing; and
a second corner positioning fixture attached to the second end of the base of the housing, wherein the second corner positioning fixture comprises a left circular arcuate surface located on a left side of the measuring axis and a right circular arcuate surface located on a right side of the measuring axis, wherein the left and right circular arcuate surfaces are defined by a second circle having a second center on the measuring axis proximal from the distal end of the tape, wherein the left circular arcuate surface contacts a third framing member and the right circular arcuate surface contacts a fourth framing member when the second corner positioning fixture is inserted into a second framing corner defined by the third and fourth framing members, wherein the second framing corner is located diagonally opposite from the first framing corner, and wherein the circle is located in a plane defined by the measuring axis and the opposing edges of the tape when the tape is extended out of the housing,
wherein the squaring tape apparatus is configured to measure a distance between the first and second framing corners.

18. An apparatus according to claim 17, wherein the left circular arcuate surface comprises a first endpoint defined by a first angle bisected by the measuring axis and having a first vertex on the measuring axis, wherein the first angle is 60° or more.

19. An apparatus according to claim 18, wherein the right circular arcuate surface comprises a first endpoint defined by the first angle.

20. An apparatus according to claim 17, wherein the left circular arcuate surface comprises a second endpoint defined by a second angle bisected by the measuring axis and having a second vertex on the measuring axis, wherein the second angle is less than 180°.

21. An apparatus according to claim 20, wherein the right circular arcuate surface comprises a second endpoint defined by the second angle.

22. An apparatus according to claim 17, wherein the first corner positioning fixture is in the form of a generally circular disc.

23. An apparatus according to claim 17, wherein a distance between the first end of the base and the second center of the second corner positioning fixture is greater than a distance between the first end and the second end of the base.

24. An apparatus according claim 17, wherein the second corner positioning fixture is in the form of a generally circular disc.

25. An apparatus according to claim 17, wherein the apparatus comprises a third corner positioning fixture attached to the housing such that the second corner positioning fixture is located between the third corner positioning fixture and the housing along the measuring axis, wherein the third corner positioning fixture comprises a left circular arcuate surface located on a left side of the measuring axis and a right circular arcuate surface located on a right side of the measuring axis, wherein the left and right circular arcuate surfaces are defined by a third circle having a third center on the measuring axis, wherein the left circular arcuate surface contacts the third framing member and the right circular arcuate surface contacts the fourth framing member when the third corner positioning fixture is inserted into the second framing corner.

26. An apparatus according to claim 17, wherein the tape comprises visible indicia configured to indicate a distance between the first axis and the second axis along the measuring axis.

27. A kit configured to convert a tape to a squaring tape apparatus, the kit comprising:
a first corner positioning fixture apparatus configured to attach to a distal end of tape contained within a housing, wherein first corner positioning fixture apparatus positions a first corner positioning fixture that comprises a left circular arcuate surface located on a left side of the measuring axis and a right circular arcuate surface located on a right side of the measuring axis, wherein the left and right circular arcuate surfaces are defined by a first circle having a first center on the measuring axis proximal from the distal end of the tape, wherein the left circular arcuate surface contacts a first framing member and the right circular arcuate surface contacts a second framing member when the tape is extended from the housing such that the first corner positioning fixture is inserted into a first framing corner defined by the first and second framing members, wherein the circle is located in a plane defined by the measuring axis and the opposing edges of the tape when extended out of the housing; and a second corner positioning fixture apparatus configured to attach to the housing containing the tape, wherein the second corner positioning fixture apparatus positions a second corner positioning fixture that comprises a left circular arcuate surface located on a left side of the measuring axis and a right circular arcuate surface located on a right side of the measuring axis, wherein the left and right circular arcuate surfaces are defined by a second circle having a second center on the measuring axis proximal from the distal end of the tape, wherein the left circular arcuate surface contacts a third framing member and the right circular arcuate surface contacts a fourth framing member when the second corner positioning fixture is inserted into a second framing corner defined by the third and fourth framing members, wherein the second framing corner is located diagonally opposite from the first framing corner, and wherein the circle is located in a plane defined by the measuring axis and the opposing edges of the tape when the tape is extended out of the housing;

wherein the tape, first corner positioning fixture apparatus attached to the tape and second corner positioning fixture apparatus attached to the housing are configured to measure a distance between the first and second framing corners.

28. A kit according to claim 27, wherein the second corner positioning fixture apparatus is adhesively attached to the housing.

* * * * *